(12) United States Patent
Cox et al.

(10) Patent No.: US 6,871,082 B2
(45) Date of Patent: *Mar. 22, 2005

(54) TELEPHONE CALL MANAGEMENT SYSTEM AND METHOD

(75) Inventors: Patrick M. Cox, Tigard, OR (US); Christopher A. Huey, Banks, OR (US); Michael A. Kepler, Aloha, OR (US); Paul W. Filliger, Silverton, OR (US); A. Peter Powell, Colton, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 398 days.

This patent is subject to a terminal disclaimer.

(21) Appl. No.: 09/878,544

(22) Filed: Jun. 11, 2001

(65) Prior Publication Data

US 2001/0044325 A1 Nov. 22, 2001

Related U.S. Application Data

(63) Continuation of application No. 09/070,522, filed on Apr. 29, 1998, now Pat. No. 6,256,515.

(51) Int. Cl.[7] .................................................. H04Q 7/20
(52) U.S. Cl. ...................... 455/565; 455/414.1; 455/445
(58) Field of Search .............................. 455/414.1, 410, 455/411, 432.3, 435.1, 445, 550.1, 560, 565, 406, 403; 379/121.1, 112.01, 114.01, 115.01

(56) References Cited

U.S. PATENT DOCUMENTS

| | | | |
|---|---|---|---|
| 4,608,460 A | * | 8/1986 | Carter et al. .................. 379/71 |
| 4,942,598 A | | 7/1990 | Davis |
| 4,979,206 A | * | 12/1990 | Padden et al. ............ 379/88.01 |
| 4,979,207 A | | 12/1990 | Baum et al. |
| 5,046,088 A | | 9/1991 | Margulies |
| 5,063,588 A | | 11/1991 | Patsiokas et al. |
| 5,148,472 A | | 9/1992 | Freese et al. |
| 5,200,995 A | | 4/1993 | Gaukel et al. |
| 5,291,543 A | | 3/1994 | Freese et al. |
| 5,471,524 A | | 11/1995 | Colvin et al. |
| 5,473,671 A | | 12/1995 | Partridge, III |
| 5,483,575 A | | 1/1996 | Zdanowski et al. |
| 5,517,549 A | | 5/1996 | Lee |
| 5,559,860 A | | 9/1996 | Mizikovsky |
| 5,566,234 A | | 10/1996 | Reed et al. |
| 5,579,376 A | | 11/1996 | Kennedy, III et al. |
| 5,642,401 A | | 6/1997 | Yahagi |
| 5,745,559 A | | 4/1998 | Weir |
| 5,765,108 A | | 6/1998 | Martin et al. |
| 5,836,067 A | * | 11/1998 | Cochran ....................... 29/263 |
| 5,850,599 A | | 12/1998 | Seiderman |
| 5,875,404 A | | 2/1999 | Messiet |
| 5,892,820 A | * | 4/1999 | Armstrong et al. .... 379/213.01 |
| 5,903,830 A | | 5/1999 | Joao et al. |
| 5,926,533 A | | 7/1999 | Gainsboro |
| 5,926,754 A | * | 7/1999 | Cirelli et al. ................ 455/417 |

(List continued on next page.)

*Primary Examiner*—Jean Gelin
(74) *Attorney, Agent, or Firm*—Kaye Scholer LLP

(57) ABSTRACT

A call management system is provided to manage the use of specified wireless telephones in order to limit or manage their use for unofficial calls and to report on official as well as unofficial uses. Calls originated from or directed to a controlled wireless telephone are routed to a call management center from a wireless central office. The call management center determines whether the call is approved by consulting a database of approved telephone numbers. If the call is approved it is completed normally. If the call is not approved, the caller is prompted to provide an access code. The call is completed if the access code matches a predetermined security code. Customizable exception reports are generated to reflect unofficial usage, incorrect access attempts, and other detailed information concerning the use of the specified wireless telephones.

17 Claims, 3 Drawing Sheets

U.S. PATENT DOCUMENTS

| | | |
|---|---|---|
| 5,974,133 A | 10/1999 | Fleischer, III et al. |
| 5,983,091 A * | 11/1999 | Rodriguez ................. 455/405 |
| 5,983,108 A | 11/1999 | Kennedy, III et al. |
| 6,052,579 A * | 4/2000 | McC Estabrook .......... 455/418 |
| 6,256,515 B1 * | 7/2001 | Cox et al. .................... 455/565 |
| 6,373,931 B1 * | 4/2002 | Amin et al. ........... 379/121.01 |
| 6,483,910 B1 * | 11/2002 | Council ................. 379/127.01 |

\* cited by examiner

TELEPHONE CALL MANAGEMENT SYSTEM AND METHOD

This application is a continuation of application Ser. No. 09/070,522, filed on Apr. 29, 1998.

BACKGROUND OF THE INVENTION

1. Technical Field

The present invention relates to the field of telecommunications. In particular, a call management system is provided for selectively controlling, monitoring and reporting on the use of selected wireless telephones.

2. Discussion of the Related Art

The use of wireless telephones is widespread. Their increasing functionality, decreasing price, and the demand for fast, easy access to voice communications ensure that the popularity of such devices will continue. These advantages, plus their portability and versatility, make them very useful in enabling communication with and among employees or representatives of an organization. For example, salespersons can be in contact with a home office between visits to clients in order to receive the latest price and product information, place orders, etc., or police officers may be issued wireless telephones to use in certain situations in order to leave police radio facilities free for other use. A police department may, for instance, use wireless telephones in place of police radio equipment to prevent others from intercepting radio broadcasts.

Organizations taking advantage of the benefits of wireless communications typically do so by issuing wireless telephones to selected employees. Alternatively, the organization may simply reimburse employees for their acquisition, usage, and/or maintenance costs.

Extensive subsidization of wireless telephone usage within an organization requires some form of management and control, however, lest the cost to the organization become prohibitive. For example, with most wireless telephones all usage is billed—regardless of whether the usage involves an outgoing or incoming call. When the usage is related to the employee's official duties for the organization, the cost is normally to be borne by the organization. However, payment for personal use of an assigned wireless telephone may be the responsibility of the employee if there is no organizational policy to the contrary. An organization may, for example, be willing to permit personal use of a wireless telephone assigned to an employee provided that the employee reimburses the organization for some or all of such use. There is thus a need to determine the type of usage of a subsidized wireless telephone (i.e., official or personal) and to report to the organization on the type and level of use of the telephone.

Controlling the usage of wireless phones by requiring each caller to input an access code or account number in order to dial a telephone number outside the organization has been heretofore unknown. This is because the switch that handles calls from an organization's wireless telephones is typically not owned or operated by the organization and is therefore beyond its control. Instead, calls from the organization's wireless telephones are received and handled by a wireless switching center that is external to the organization. In addition, the switching center simultaneously handles calls from numerous users other than the organization. Controlling, or even reporting, the usage of a subsidized telephone thus requires some method of determining which calls into the switching center involve organization-subsidized telephones. Also, even if outgoing calls from a subsidized wireless telephone could be identified and controlled in this manner, incoming calls would still need to be controlled if they are to be billed as well.

Effective management of its wireless telephones also requires adequate reporting to the organization concerning the telephones' usage. Reported data for each subsidized telephone preferably includes enough information to determine each use was for official or personal purposes, plus details such as times and duration of use.

There exists, therefore, a need for a system and method for controlling wireless telephone usage in order to prevent or report unofficial usage and to report or account for official usage.

Besides identifying each call as official or personal in nature, an employee should be able to specify a specific account number to which a call is to be assigned. For each call so assigned, it should be reported to the organization or the employee under the assigned account.

There is therefore also a need in the art for a system and method for assigning a call to or from a specified wireless telephone into one of a plurality of accounts.

SUMMARY OF THE INVENTION

In view of the need in the art for means and methods for monitoring and restricting wireless telephone usage, it is an object of the present invention to identify unofficial or unauthorized usage of specified wireless telephones.

It is a further object of the invention to allow full use of specified wireless telephones for official or approved communications.

It is also an object of the invention to provide control of unofficial usage of specified wireless telephones by preventing or restricting such use.

It is a further object of the invention to allow a caller to assign use of a wireless telephone to one of a plurality of accounts.

It is yet another object of the invention to provide for the recording of unofficial usage of specified wireless telephones.

It is still another object of the invention to enable the generation of various types of reports concerning official and unofficial wireless telephone usage.

In accordance with the present invention, a call management center maintains a database concerning wireless telephones that are provided or subsidized by a customer organization. The database includes, for each subsidized telephone, a telephone identification number to uniquely identify the telephone, one or more access codes to identify an employee to which the phone is assigned (e.g., the employee may be assigned both a personal access code and a business access code and/or may be rotated among a plurality of employees), and one or more telephone numbers to which an assigned employee may be connected without restriction. Calls to or from other numbers, however, are to be restricted, prevented, recorded, or merely reported, depending upon the organization's needs and desires.

In an embodiment in which calls placed from wireless telephones provided or subsidized by the organization are to be controlled, outgoing calls from the telephones are routed through a wireless central office or wireless switching center. The telephone identification number of the originating telephone, in the form of a Mobile Identification Number ("MIN") or Electronic Serial Number ("ESN"), is read from the call stream.

When calls to (rather than from) the organization's wireless telephones are to be controlled, the caller's telephone number is determined by the ANI (Automatic Number Identification) or caller identification number—which is also retrieved from the call stream. It can be determined that a call is being placed to a controlled wireless telephone by comparing the destination telephone number to a list of telephone numbers of such controlled wireless telephones.

Based on the wireless telephone's identification number (e.g., MIN or destination number), the wireless central office consults a database of controlled wireless telephones to determine whether use of the wireless phone is controlled (i.e., whether the telephone is provided or subsidized by the organization).

If the wireless telephone is identified as a controlled phone, the call is routed to the call management center over a link between the wireless control office and the call management center. The call management center's database is searched, using the wireless telephone identification number and the telephone number of the other party, to determine whether connection to or from the other telephone number is approved for unrestricted connection. If the other telephone number is listed in the controlled phone's database record (thus indicating the number is approved by the organization), the call is completed in the normal manner.

If, however, the telephone number is not listed in the database record, thus indicating that the call is not officially approved, the caller is informed that the connection is not pre-approved (e.g., that it is not recognized as an "official" use of the controlled phone). The caller is offered the opportunity to provide an access code to reflect the nature of the call (e.g., official or personal). If the employee decides to complete the call, he or she will provide either an official code, indicating that the call is for official business despite not being pre-approved, or a personal code, indicating that the call is not for official purposes. The provided code is verified by comparing it with the access code(s) stored in the controlled phone's database record. If the provided code matches a stored code, the call is completed and, when reported to the organization, will be listed under the access code.

Customized reports are provided to the subsidizing organization for each controlled wireless telephone. Reports can be made at regular periods of time (e.g., daily, weekly) r upon the occurrence of certain events (e.g., an employee incurs $100 in telephone service charges). In the reports, calls are separated into official and personal categories and include information concerning the party to which the employee was connected, the date and time of connection, and the duration of each call.

Besides distinguishing between official and unofficial usage of a selected wireless telephone, the call management center also allows a caller to specify a specific account code to which a call is to be assigned for accounting purposes. An account code may, for example, represent a client of the organization to whom certain calls should be billed. Calls assigned to a specific account are reported as such to the organization.

BRIEF DESCRIPTION OF THE DRAWINGS

These and other objects, features and aspects of the present invention will become more readily apparent from the following detailed description which should be read in conjunction with the accompanying drawings, in which.

DETAILED DESCRIPTION OF THE INVENTION

The following embodiments are described in the context of wireless communications to and from employees or representatives of an organization. Calls to and from specified wireless telephones used by the employees are routed through a call management center staffed by call management assistants (e.g., operators, voice servers) in order to restrict or monitor usage of the specified telephones. Those skilled in the art, however, will recognize that the disclosed methods and structures are readily adaptable for broader application.

A primary use of the systems and methods for providing call management services that are described herein is for the management of calls originating from an organization's wireless telephonic devices. The described services may also, of course, be used to control calls to such devices or telephones. Descriptions of the provided call management services should therefore be interpreted to include communications directed in both directions, except where otherwise indicated.

Figure 1:
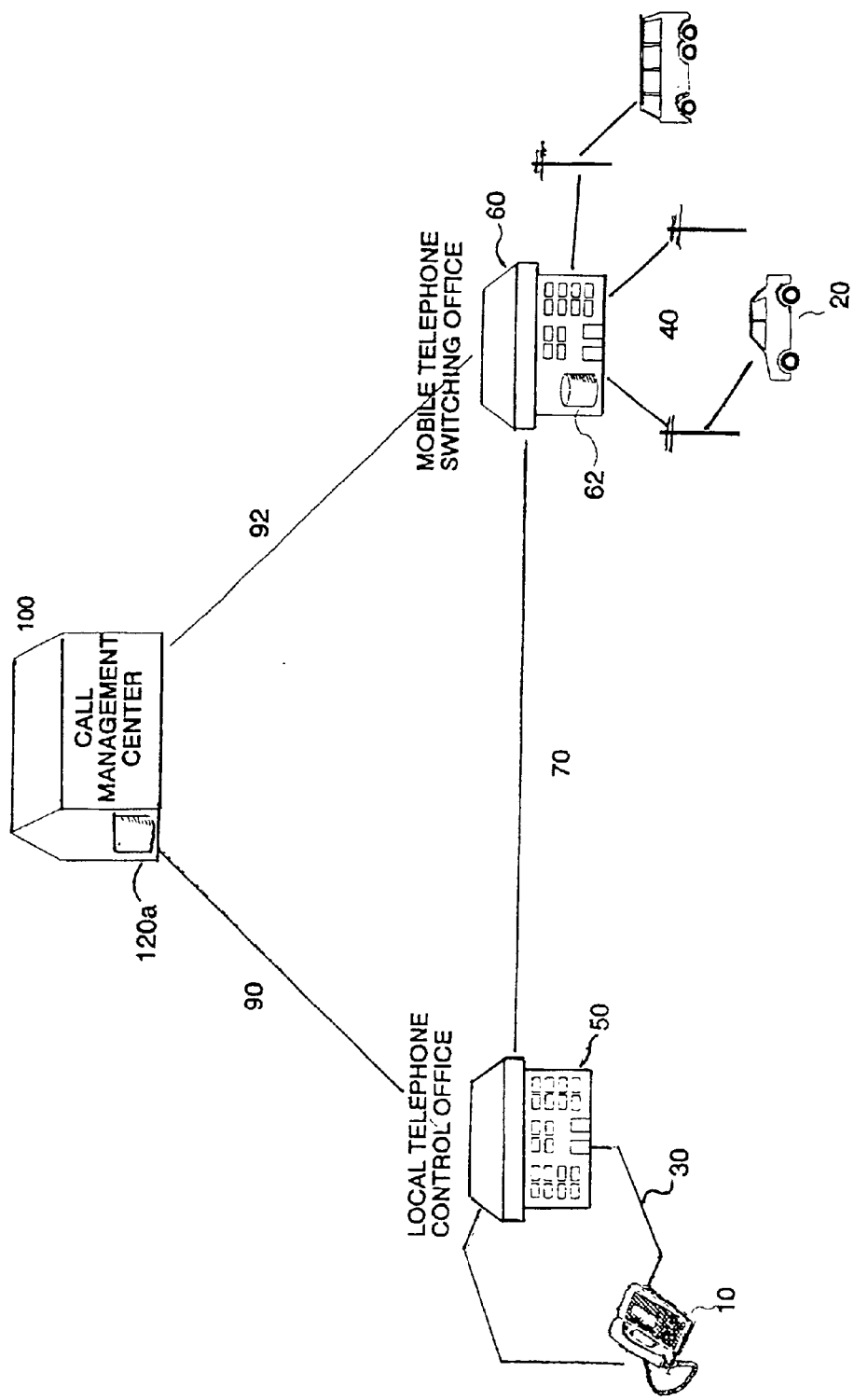
FIG. 1 is an illustrative depiction of a call management system for carrying out the invention.

With reference to FIG. 1, an illustrative call management system is depicted. Wired telephones such as telephone 10 are connected to local landline network 30 and wireless telephones (such as the wireless telephone depicted by the numeral 20) are used within wireless network 40. Central office 50 directs the routing of calls within landline network 30 and between landline network 30 and interconnecting network 70. Mobile switching center ("MSC") 60 directs the routing of calls within wireless network 40 and between wireless network 40 and interconnecting network 70. Multichannel communication links 90, 92 link landline network 30 and wireless network 40 to call management center 100.

Figure 2:
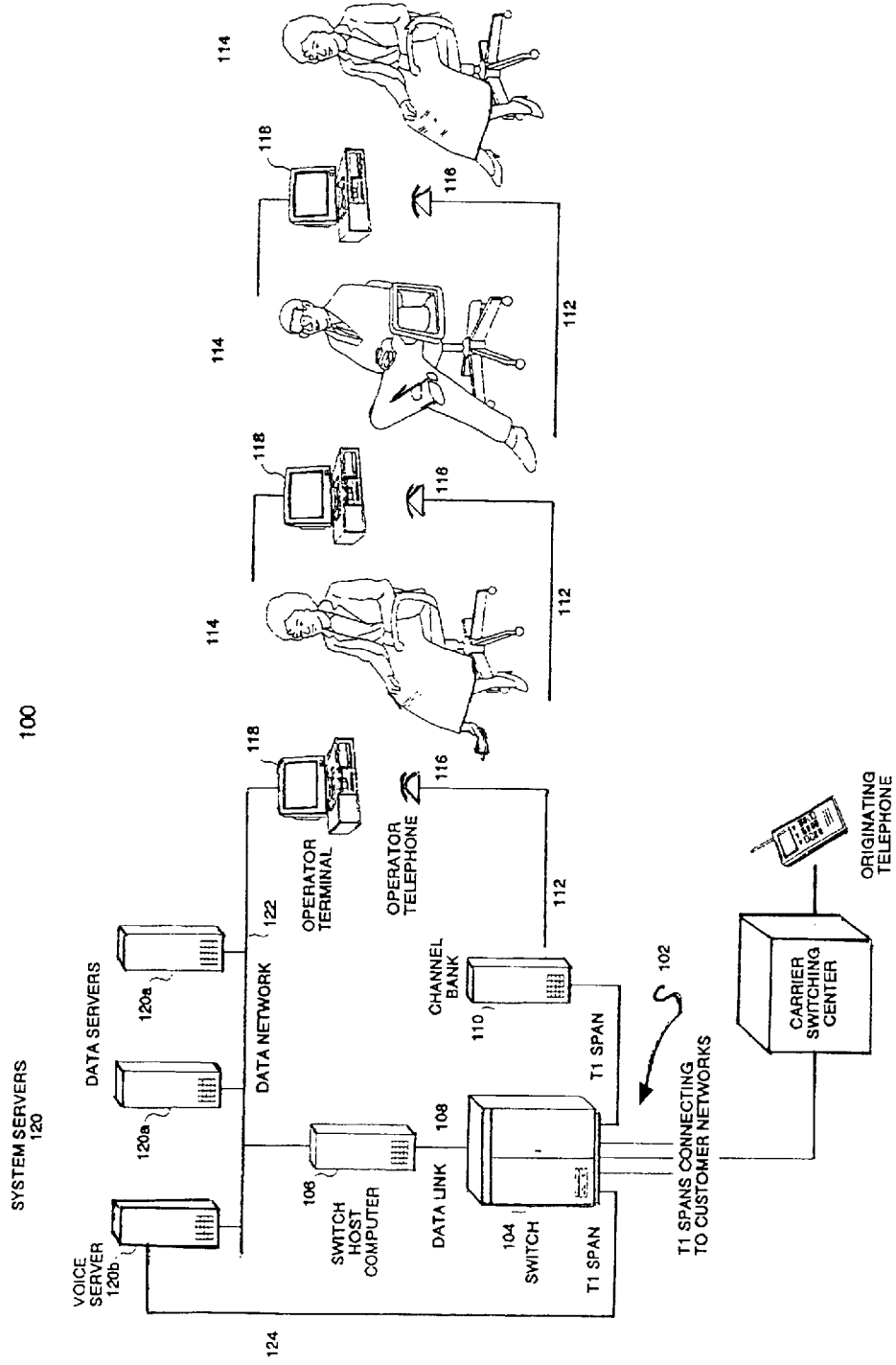
FIG. 2 depicts the components of a call management center for use in the call management system of FIG. 1.

Call management center 100 is described in detail in conjunction with FIG. 2 but it is noted here that the call management center includes data server 120a. Similarly, mobile switching center 60 includes data server 62. Databases on data servers 62 and 120a contain information concerning wireless telephones which are to be managed in accordance with the various embodiments of the invention. Illustratively, data server 62 contains telephone identification numbers corresponding to those wireless telephones that are to be managed or controlled. These identification numbers match the controlled telephone's Automatic Number Identification ("ANI") and/or Mobile Identification Number ("MIN"). Data server 120a illustratively contains this information and much more, as described below in conjunction with FIG. 2.

In a present embodiment of the invention, a call is received at MSC 60 from a wireless telephone 20 and is targeted at destination telephone 10. The destination telephone could, alternatively, be another wireless telephone in wireless network 40 or could be a telephone attached to another telephone network (not shown in FIG. 1) connected to interconnecting network 70. From the call stream received at MSC 60, the MIN of originating wireless telephone 20 and the telephone number of the destination telephone can be retrieved. The database of controlled wireless telephone numbers on data server 62 is searched for the wireless telephone's MIN. If it is not found, the call is not to be controlled and it is completed normally.

If, however, the MIN of originating wireless telephone 20 matches an entry within the database on data server 62, MSC 60 transfers the call to call management center 100 across multichannel communication link 92. Within call management center 100, and as discussed in detail below, the call is further examined to determine whether calls from wireless telephone 20 to destination telephone 10 have been pre-approved for completion by the organization sponsoring wireless telephone 20. If so, the call is transferred back across multichannel communication link 92 to MSC 60, from where it is forwarded across interconnecting network 70 to central office 50, landline network 30 and destination telephone 10. If the call is not pre-approved, the caller is offered the opportunity to provide an access code (e.g., an official or personal code) authorizing the call to be completed. If the caller does not provide an access code, the call is disconnected from call management center 100 and MSC 60. If the caller does provide an access code, he or she may also specify a separate account number to which the call is to be billed.

Figure 3:
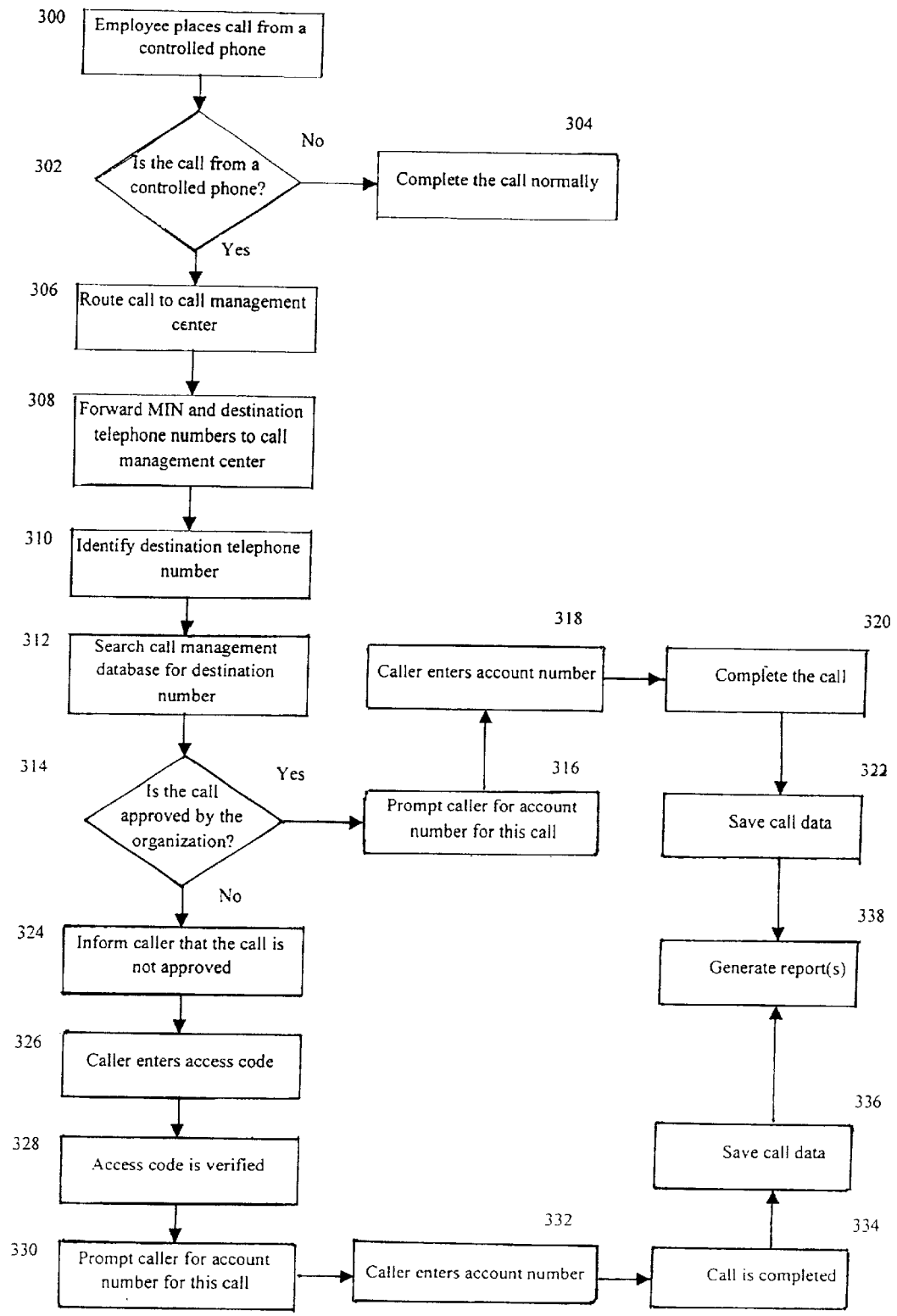
FIG. 3 is a flowchart depicting one method of managing the use of controlled wireless telephones.

Also as described below, customizable reports are generated and submitted to the organization responsible for each controlled telephone in order to properly assign financial responsibility for calls and to verify that the telephones are being used appropriately. At a minimum, the reports are separated by each controlled wireless telephone, with calls for each telephone being divided into official and unofficial categories. The reports may also identify which calls were completed even though not pre-approved, identify account numbers where provided, and report the date and duration of each call. FIG. 3, discussed below, presents a detailed description of one embodiment of the invention.

With reference now to FIG. 2, however, an illustrative call management center 100 according to an exemplary embodiment of the invention is depicted. External communication links 102, which include multichannel communication links 90, 92, connect call management center 100 to wireless switching centers (e.g., MSC 60), central offices (e.g., central office 50) and customer telephone networks. Communication links 102 connect to call management switch 104, which is connected to switch host computer 106 via switch data link 108. In an alternative embodiment, switch host computer 106 is coterminous with call management switch 104.

Call management switch 104 is connected via a T1 communication link to channel bank 110, and from channel bank 110 to operator channel 112 and operator telephone 116. Operator telephones are located at each of one or more operator positions (represented by the numeral 114 in FIG. 2). Using operator data terminal 118, a live operator at operator position 114 accesses one or more system servers 120, which are inter-connected via data network 122. Switch host computer 106 is also connected to data network 122. Finally, switch 104 is connected to one or more voice servers which are described below. Each connection to a voice server employs a T1 or other high-bandwidth voice server link (a first voice server link 124 is shown in FIG. 2).

As stated above, communication links 102 provide telephone connections to call management center 100 for incoming calls and also provide access to-external telephone networks over which outgoing calls are placed. An incoming call is received via inbound channels (not separately shown in FIG. 2) and an outgoing call is placed over outbound channels (not separately shown in FIG. 2). There is generally one outbound channel for every inbound channel so that for every call into call management center 100 there is an outbound channel available to reach the caller's desired party or parties. Communication links 102 may, in an illustrative embodiment, be comprised of one or more T1 communication spans which are known in the art. In such an embodiment, each individual call over a T1 span, whether into or out of call management switch 104, utilizes one of the 24 individual channels into which a T1 span is segmented, each channel providing two-way communication. The communication links may, alternatively, embody such technologies as CCSS7 (Common Channelling Signal System 7) or ISDN (Integrated Services Digital Network).

Switch host computer 106 stores and executes computer-readable instructions for the purposes of, among others, configuring and operating call management switch 104 and directing the transfer of calls through switch 104. It also directs the playback (illustratively, by voice server 120*b*) of recorded messages and tones to callers connected to call management center 100. Recorded messages may constitute greetings, closings and other informational messages pre-recorded in the voice of an operator or other person. Tones are sounded on a connected party's line in order to, for example, prompt the connected party to enter an access code or account number (described below) or to alert the party to an error.

Switch host computer 106 also maintains call data for calls recently (e.g., within the past 2 hours) connected through call management center 100. Call data stored on the switch host computer reflect details such as the originating telephone number, the date and time of the caller's connection to call management center 100, the T1 span and channel of communication links 102 that the caller connected through, the caller's destination telephone number and destination party, the status of the call, which (if any) call management assistant (e.g., operator, voice server) assisted the caller, etc. As described below, call management data and billing data are stored on system servers 120. Some of the call information stored on switch host computer 106 and system servers 120 is provided to customers and customer organizations upon request and/or on a regular basis. From the collected call information, a customer organization can monitor official and unofficial use of the wireless telephones provided to its employees.

Further, switch host computer 106 directs the transfer of information between itself and system servers 120 (via data network 122) as well as the transfer of information between system servers 120 and switch 104 and/or operator position 114.

In one embodiment of the invention, and under the direction of switch host computer 106, switch 104 acts as a tandem switch. In this embodiment, call management center 100 receives calls to or from controlled wireless telephones, determines whether each such call is for official business, and takes further action as necessary to properly account for and report on the use of such telephones, all without operator intervention. Any voice messages played for customers in this embodiment are provided by voice server 120*b*, which is described below. Switch 104 may, however, be configured such that a caller may be connected to a human operator by pressing a specified telephone key.

In other embodiments of the invention, call management center 100 provides directory assistance functions in addition to call management. In these embodiments, operator positions 114 include means by which a live operator receives calls, determines callers' informational needs, searches for and retrieves information from system servers 120, provides information to callers, and initiates outgoing calls. Each operator at an operator position 114 is provided with a telephone headset 116 for interacting with callers, and data terminal 118, connected to data network 122, for interacting with system servers 120.

System servers 120, which are interconnected via data network 122, include one or more data servers 120a to provide and manage data services within call management center 100. Data servers 120a maintain one or more databases and other information in computer-readable form, any or all of which may be collocated: call management databases of data pertaining to the wireless telephones that are subsidized or provided by customer organizations and which are to be monitored or controlled in accordance with the present invention; directory assistance databases containing directories of businesses and telephone numbers; and billing databases storing billing information. Call management data is retrieved by switch host computer 106 when a call is received from a subsidized wireless telephone. Directory assistance data is searched by operators in response to callers' requests. Billing data is retrieved as needed to generate bills and usage reports for customers.

Call management database records are indexed by each controlled wireless telephone's identification number (e.g., its MIN and/or ANI) and contain the telephone numbers from and/or to which calls may be received and made without restriction (i.e., "approved" or "pre-approved" telephone numbers). Approved telephone numbers may be stored according to their individual numbers (e.g., 503/555-1234) or by shorthand representation of groups of numbers (e.g., 503/xxx-xxxx to represent all numbers in the 503 area code, or 503/555-xxxx to represent all numbers with a specified prefix).

The call management database(s) may be incomplete, however, in that an employee may place a call which, although not listed in a database as approved, nonetheless constitutes an official call (e.g., a sales representative may be calling a prospective new customer, or a police officer may be following up on a tip concerning a criminal investigation). Therefore, each database entry for a controlled wireless telephone has associated with it one or more access codes which may be used when a call would otherwise be blocked because the destination number is not pre-approved. At least one such access code for each telephone represents an official access code, the use of which reflects the caller's assertion that the call is for official use. Each telephone is also assigned at least one personal access code. The personal access code is used by the assigned employee when he or she makes a personal call, and may signify that he or she will pay for the call.

In the illustrative embodiment of the invention described below in conjunction with FIG. 3, a call from a controlled wireless telephone is routed to call management center 100. Switch host computer 106, upon determining that the destination number is not pre-approved, sounds a distinctive tone on the caller's line signifying that the call is not approved. The caller is thus prompted to enter an appropriate access code to override the call blocking. Alternatively, a voice server may be connected to the caller's line to voice a message explaining that the destination number is not recognized as an officially-approved number and to elicit an access code if the caller wishes to complete the call. The voice server may, for example, be connected to the line if the caller does not respond to the distinctive tone within an appropriate period of time (e.g., two seconds).

In a present embodiment, the access codes assigned to each telephone are unique among all of an organization's controlled wireless telephones and are preferably known only to the assigned employee. The access codes are therefore changed when controlled telephones are reassigned within the organization. Employees thereby avoid being charged for other employees' calls and a thief will find it difficult or impossible to use the stolen telephone. Alternatively, the access codes may be unique to each employee and multiple access codes may be valid for use on any given controlled telephone—thereby allowing an employee to use any of a number of telephones instead of being tied to one.

In addition to, or in place of, the access codes described immediately above, an organization may specify that an employee is permitted (or even required) to enter an account number to which a call is to be charged. Use of account numbers could, for example, enable the employee's organization to accurately assign financial responsibility for employees' calls at the time they are made. This would avoid the problem of trying to determine whom to bill for a call at some time after the call (when the purpose of the call may be forgotten) and could even allow for faster billing. In this embodiment of the invention, account numbers may be entered for any call routed through call management center 100, whether official or unofficial, perhaps even including calls not involving a subsidized wireless telephone. Account numbers may, for example, represent particular customers of an organization. A sales representative of an organization may enter the account number of the customer that he is calling, or an attorney may enter the account number of a client to be billed for a call. Illustratively, account numbers are entered in response to a second distinctive tone, different from the prompt for an access code. Valid account numbers could be stored in the call management databases on data server 120a so that call management center 100 may verify a number provided by an employee. Alternatively, the account number entered by an employee could be accepted as entered and, when included in a report to the organization, be verified by the organization itself.

Data servers 120a also, as introduced above, store directory assistance data relating to a caller's directory assistance requests for subsequent retrieval by call management assistants furnishing later directory assistance to the same caller. Directory assistance data relates to the directory assistance previously provided to a caller, and illustratively includes how and where a call management assistant searched for information to satisfy a request, the information retrieved by the assistant, how that information was displayed for the assistant, and the form in which it was communicated to the caller. Data servers 120a save directory assistance data concerning all requests made by a caller during his or her connection to call management center 100 (not just the most recent request), but only retain the information for a predetermined period of time (illustratively, one hour).

Also on data servers 120a, information required for billing purposes is stored in the form of call records within a billing database. Call records are created for each call handled by call management center 100. They contain data such as the caller's telephone number, the date and time of the caller's connection to call management center 100, any access codes or account numbers entered during the call, the names and telephone numbers of destination parties, the dates and times of attempted connections to destination parties, the duration of each call leg, etc. A call record is updated each time action is taken to further a call, and is closed when the caller disconnects from call management center 100. The information captured in call records overlaps somewhat with the call data collected by switch host computer 106 (described above).

The software used to create and manipulate the databases on data servers 120a allows call management assistants to search the databases as necessary (e.g., by MIN or ANI of a controlled wireless telephone, by name, address, geographical region, or type of good or service desired by a caller, etc.).

From the various call data maintained on data servers 120*a* and system server 106, reports are generated to inform customer organizations of the usage of its wireless telephones. The reports are highly customizable and illustratively identify, for each wireless telephone, one or more pieces of information such as: destination numbers called from the wireless phone; originating numbers that called the wireless phone; names of destination parties associated with numbers called from the phone; names of originating parties associated with numbers that called the phone; the date, time and duration of connections to each destination number and/or from each origination number; the access code entered by the employee; any account number entered by the employee; etc. Reports can be divided by approved numbers (i.e., those origination and destination numbers identified in the call management databases on data servers 120*a*), official calls not pre-approved (i.e., those calls for which the employee provides his or her official access number), personal calls, account number, date, time, etc., or any combination of these or similar parameters.

The reports generated from the call records may be provided to an organization in hard-copy or electronic form. If provided electronically, they may be sent by e-mail or in a database or other searchable format, and may be delivered via, illustratively, a dial-up, dedicated, or internet connection. The reports may be forwarded to the organization on a regular (i.e., daily, weekly, etc.) basis, may be compiled and forwarded according to specified thresholds (e.g., such as when an employee hits a pre-specified level of usage (e.g., $100 in a thirty day period), or may be provided in real-time.

System servers 120 further include one or more voice servers (a first voice server 120*b* is shown in FIG. 2) that provide, in alternative embodiments of the invention, all or a subset of the call management and directory assistance functions provided by a live operator at operator position 114. For example, voice servers store and deliver messages that live operators would otherwise be required to frequently repeat, such as greetings, closing messages, a caller's requested telephone number, and, as described below, informational messages concerning restricted use of wireless telephones.

In an illustrative embodiment of a voice server, voice server 120*b* is connected to call management switch 104 by voice server link 124 and to switch host computer 106 and data servers 120*a* via data network 122. Each voice server connects to call management switch 104 via a separate voice server link. Voice server 120*b* illustratively consists of a general purpose computer plus one or more voice cards with which to interface with voice server link 124. Each voice card monitors and controls communications over a voice server link 124; its capabilities include telephone tone detection and generation, voice recording and playback, and call progress analysis. Therefore, similar to call management switch 104, voice server 120*b* is capable of detecting connection status conditions, generating tones, and detecting customer keypresses.

Voice server 120*b* also includes typical computer components such as a central processing unit, a data storage unit, and a bus for transferring voice and data signals. Voice server 120*b* may also contain a voice recognition subsystem for receiving verbal input from a party connected to the voice server. Although FIG. 2 depicts voice server 120*b* distinct from data servers 120*a*, in alternative embodiments they are coterminous.

Voice server link 124 provides voice connections between call management switch 104 and voice server 120*b*, thus supplying the means by which callers may be connected to voice server 120*b* and receive automated call assistance. Voice server link 124, in an illustrative embodiment of the invention, is comprised of one or more T1 spans, with each one of the 24 channels of each span providing two-way communication.

Method of Operation

In an illustrative embodiment of the invention, an organization issues or subsidizes wireless telephone usage for selected employees, agents or representatives (collectively, "employees"). The organization does not restrict usage of the wireless telephones when used to receive or make calls related to the business of the organization (e.g., to and from telephone numbers approved by the organization, such as the telephone number of the organization's central switch or telephone numbers of the organization's offices in a given region, etc.). When, however, an employee makes or receives a call not pre-approved, the call may be blocked (i.e., not completed) or may only be completed upon either the employee's certification that the call is for official purposes or the employee's acceptance of financial responsibility for the call. The access code, either official or personal, entered by a caller determines which of these two categories an otherwise-unapproved call is placed into. Alternatively, all unapproved calls are simply blocked, i.e., not completed, and the caller informed that the desired number cannot be called from the caller's phone.

In the embodiment depicted in FIG. 3, a call is received at call management center 100 that originated from a wireless phone issued by an organization (a "controlled phone"), the usage of which is restricted or managed under the present invention. In other embodiments of the present invention, calls to controlled phones (in addition to, or instead of, calls from controlled phones) are restricted.

An employee with a controlled phone places (step 300) a call. The MSC (Mobile Switching Center) 60 serving the wireless network 40 to which the caller is connected, also known as an MTSO (Mobile Telephone Switching Office) determines (step 302) whether the call is from a controlled phone. MSC 60 accomplishes this by extracting the MIN (Mobile Identification Number), ANI (Automatic Number Identification), and/or ESN (Electronic Serial Number) from the call stream initiated by controlled phone 20. (Hereinafter, the term MIN will be used to refer to whichever identification number is relied upon to identify an originating controlled telephone.) The MIN of each call received by MSC 60 is compared to the entries in a database 62 of controlled phone numbers. If no match is found, the originating wireless telephone is not a controlled phone and the call is completed normally (step 304).

If, however, the MIN matches one of the database entries, then the call is from a controlled phone and it is routed (step 306) to call management center 100 over multichannel communication link 92. The MIN and destination numbers are also forwarded (step 308) to the call management center. The destination number is necessary in order to determine whether the call is pre-approved and also to complete the call; the MIN is needed by the call management center in order to correctly account for the call and to bill for its services.

The destination number of the call is extracted (step 310) so that it can be determined whether the call is approved by the organization. Using the MIN of the originating controlled phone, data server 120*a* searches (step 312) its call management databases and retrieves a database record corresponding to the controlled phone's MIN. Data server 120*a* then determines whether the destination telephone number is listed as a pre-approved number in the controlled phone's database record and reports its finding.

If the number is included (step 314) in the controlled phone's record(s) (i.e., the call is approved), it will be completed by switch 104 by passing the call back through multichannel communication link 92 or other appropriate external communication link 102. In an alternative embodiment in which call management center 100 has been instructed to record all calls from the controlled phone to a specified destination telephone number, the connection to the destination number will be placed through the call management center so that it may be recorded.

In the embodiment depicted in FIG. 3, and as described above, callers making use of the call management center's services may designate an account number to which a call is to be assigned. Therefore, after the call is found to be approved in step 314, in optional step 316 the caller is prompted by a distinctive tone to press the telephone keys or speak the numbers corresponding to an account number to which the call is to be assigned. In the presently-described embodiment, voice server 120b is directed by switch host computer 106 to prompt the caller with this tone when the customer organization subscribes to this optional service. The caller may then enter (step 318) an account number by pressing the corresponding telephone keys or voicing the number. The call is then completed (step 320) normally.

As with all calls handled by call management center 100, appropriate call data (described above) is saved (step 322) on data servers 120a and switch host computer 106.

If the call is not approved in step 314 (i.e., the destination telephone number is not among those listed in the call management database record corresponding to the controlled phone's MIN), further action is taken to determine whether the call should be completed despite not having been pre-approved by the employee's organization. In the illustrated embodiment, the unapproved status of the call is signalled (step 324) by a distinctive tone played by voice server 120b. In an alternative embodiment, or if the caller takes no action within a short time (e.g., two seconds) after the tone is played, the call is routed to a call management assistant such as voice server 120b. Voice server 120b informs the caller in a voice message that the destination number has not been approved as official use of his or her wireless telephone, and prompts the caller to enter an access code to authorize completion of the call.

In order to complete the call in the presently illustrated embodiment, the employee must enter (step 326) an access code assigned to the employee or the controlled phone (e.g., either the official or personal code). The access code is entered by pressing the corresponding keys or by voicing the code into the telephone. The code provided by the caller is verified (step 328) by comparing it to the access codes stored in the call management database(s) on data servers 120a. If the caller does not provide a valid access code, call management center 100 hangs up after a period of time (e.g., ten seconds).

The caller is now prompted (step 330) for an account number if the organization has subscribed to this service. In response to the tone (identical to that issued in step 316), the caller presses the keys corresponding to the account number or speaks them into the telephone (step 332). Whether or not an account number is input, the call is then completed (step 334) and call data is saved (step 336).

Calls that are handled by call management center 100 are reflected in reports provided (step 338) to the employee's organization. The various bits of information included in such reports, and the form in which they may be provided, are described above. Reports may be generated on a regular schedule (e.g., hourly, daily, weekly, etc.), after each unapproved call, or upon request of the organization. Similar information concerning approved calls may also, of course, be generated.

In the illustrated embodiment, a caller is permitted a limited number of attempts (e.g., three) to enter a valid access code in step 326. If a correct code is not entered within the allowed number of attempts, the caller is disconnected from call management center 100 without being connected to the destination party. In addition, the failed attempts are logged in the call data. When another unapproved call is placed to or from the controlled phone, the number of attempts to enter a valid number that are allowed before being disconnected may be decreased. Eventually, after a predetermined total number of incorrect entry attempts (perhaps within a specified period of time), the controlled phone's database record is amended to disallow all calls (or perhaps just all unapproved calls) to and/or from the controlled phone due to a suspicion of attempted fraudulent use of the phone. An exception report is generated and forwarded to the organization and use of the controlled phone is not enabled until a designated representative of the organization authorizes such action.

Alternatively, in response to multiple incorrect access code entries, the controlled phone may simply be disabled temporarily. For example, after a specified number of incorrect entries (illustratively, five), the phone is disabled (or disabled for all calls not involving approved numbers or using an official access code) for a predetermined period of time (illustratively, one hour), after which time it is once again enabled.

The goal of implementing either of the above disabling features is to resist fraudulent use of controlled phones. By disabling phones suspected of attempted fraudulent use, a fraudulent user (e.g., a thief) cannot simply try number after number until stumbling upon a correct access code. By allowing continued use of the phone for official (i.e., approved) calls, however, employees who forget their access codes are not prevented from making important calls.

It is conceivable that a user of a controlled phone may attempt to circumvent the restrictions mounted by the present invention by calling a directory assistance center and having a directory assistance operator connect the user to an otherwise-unapproved destination number. Therefore, in an alterative embodiment of the invention an additional safeguard is provided. If, of course, the controlled phone is not permitted to connect to a directory assistance center (e.g., by calling 411, #555, 555-1212) or other switch, this safeguard is not necessary.

In the presently described alternative embodiment, call management center 100 incorporates the functions of a directory assistance system. A directory assistance system as described in the U.S. patent application having Ser. No. 08/816,921, which is incorporated herein by reference, is suitable for this purpose. When a user of a controlled phone connects to call management/directory assistance center 100, he or she is connected to a directory assistance agent. The agent identifies a destination party based upon the user's description and would then normally initiate a connection to the destination party's telephone number. If unchecked, the controlled phone user could make numerous connections and reconnections to an agent and complete calls to many unapproved numbers. In accordance with this alternative embodiment, however, it will be determined that the call is being placed from a controlled phone by searching a database of controlled phone numbers for the user's MIN, just as an MTSO does in the embodiments described above. After the status of the controlled phone is determined, the destination number retrieved by a directory assistance agent is compared to the pre-approved numbers for the controlled phone, as set forth above. Suitable action, such as that depicted in steps 314–338 of FIG. 3, is then taken. One of skill in the art will recognize that any attempt to call a switch that a user of a controlled phone might connect to in an attempt to circumvent the present invention could be redirected to call management center 100 or simply be disallowed by the MTSO that services the controlled phone.

In another alternative embodiment—in which calls to controlled phones are restricted by routing them through call management center 100—a controlled wireless telephone is able to receive calls from approved numbers without interference. The originating telephone number is illustratively identified by the MIN or ANI received in the call stream or by other caller identification data. Alternatively, however, the caller may simply be asked for his or her originating telephone number. When a call is received from a number not previously approved, the destination employee is prompted (e.g., by a distinctive tone or a voice message) to enter an access code, and possibly an account number as well, before he or she is connected to the caller. To cue the employee that the call is not approved, the ring tone may be altered. And, so that the employee can determine which access code or account number should be entered, call management center 100 either displays (if the employee's phone is so equipped) or voices (through voice server 120b) the originating telephone number or, alternatively, records a short message (e.g., two seconds in length) from the caller, in the caller's voice, to play for the employee. Thus, when the employee answers the controlled phone, he or she is informed that a call has been attempted from an unapproved number, hears a short message identifying the caller, and is prompted for an access code in order to accept the call. Calls to controlled phones are reported to the employee's organization in similar fashion to calls from controlled phones.

In a further alternative embodiment, in which the employee must pay for unapproved calls, all calls placed to and/or from the employee's controlled phone to unapproved numbers are billed to the employee—either directly or through the organization.

In yet another alternative embodiment, controlled phones are only permitted to be used for approved calls. Therefore, all calls to or from unapproved telephone numbers are routed to voice server 120b or a human operator. Whichever directory assistance provider receives the call announces to the caller that the call is not permitted from the caller's telephone. After the caller is so informed, he or she is released from call management center 100.

The present invention may also be used in manners other than those described above without exceeding the scope of the invention. For example, approved or unapproved calls may be monitored or recorded, as specified by the organization, by voice server 120b or switch host 106. In such embodiments of the invention, the call management assistant that is to monitor or record the call is connected to the call just before the call is completed (i.e., before steps 320 or 334). The employee's organization may, for example, wish to record all calls to and/or from unapproved telephone numbers in order to monitor for security leaks or attempted fraudulent use of its wireless telephones.

Various embodiments of the invention have been described. The descriptions are intended to be illustrative, not limitative. Thus, it will be apparent to those skilled in the art that modifications may be made to the invention as described without departing from the scope of the claims set out below.

We claim:

1. A method for controlling usage of voice communications devices comprising:
   receiving call information regarding a call from a caller using a caller voice communications device;
   obtaining connection information associated with a called party voice communications device used by a called party;
   determining if the called party voice communications device is pre-approved to be connected to the caller voice communications device; and
   if the called party voice communications device is not pre-approved to be connected to the caller voice communications device, requesting an access code from the called party during the call, comparing the access code to a list of valid access codes, and if the access code corresponds to a valid access code, facilitating a connection of the caller voice communications device to the called party voice communications device.

2. The method of claim 1 further comprising facilitating a communication of a message to the called party voice communications device indicative of an identity of the caller if the called party voice communications device is not pre-approved to be connected to the caller voice communications device.

3. The method of claim 2 wherein the message comprises a telephone number associated with the caller voice communications device.

4. The method of claim 2 wherein the message comprises a recorded message from the caller.

5. The method of claim 1 wherein the called party voice communications device comprises a telephone.

6. The method of claim 5 wherein the telephone comprises a wireless telephone.

7. The method of claim 1 wherein the caller voice communications device comprises a telephone.

8. The method of claim 7 wherein the telephone comprises a wireless telephone.

9. The method of claim 1 wherein the connection information comprises a telephone number associated with the called party voice communications device.

10. The method of claim 9 wherein the telephone number is obtained by accessing a database.

11. A method for providing directory assistance services comprising:
    receiving a call from a caller on a first communications device;
    obtaining information from the caller regarding a desired party to be communicated with on a second communications device;
    obtaining connection information associated with the second communications device from a database;
    during the call, requesting information from the desired party indicating whether a voice connection between the first communications device and the second communications device should be established; and
    determining if the voice connection should be established as a function of the information from the desired party.

12. The method of claim 11 wherein the second communications device comprises a wireless telephone.

13. The method of claim 12 wherein the second communications device comprises a PCS device.

14. The method of claim 12 wherein the wireless telephone comprises a cellular telephone.

15. The method of claim 11 wherein the connection information comprises a telephone number.

16. The method of claim 11 wherein the information from the desired party is received before receiving the call from the caller.

17. The method of claim 16 wherein the information from the desired party comprises information indicating that no requested voice connections to the second communications device should be established unless the calling party agrees to pay charges which would otherwise be paid by the desired party.

* * * * *